United States Patent
Mohri et al.

[15] 3,670,598
[45] June 20, 1972

[54] CONTROL SYSTEM FOR AN AUTOMOTIVE AUTOMATIC POWER TRANSMISSION

[72] Inventors: Yoichi Mohri; Hirohisa Ichimura, both of Yokohama, Japan

[73] Assignee: Nissan Motor Company, Limited, Yokohama, Japan

[22] Filed: Oct. 13, 1970

[21] Appl. No.: 80,283

[30] Foreign Application Priority Data

Oct. 14, 1969 Japan....................................44/81753

[52] U.S. Cl............................................................74/866
[51] Int. Cl.............................................................B60k 21/00
[58] Field of Search.............................................74/753, 866

[56] References Cited

UNITED STATES PATENTS

| | | | |
|---|---|---|---|
| 3,439,564 | 4/1969 | Scholl et al. | 74/866 |
| 3,460,406 | 8/1969 | Strohm et al. | 74/866 |
| 3,572,176 | 3/1971 | Bildat | 74/866 X |

*Primary Examiner*—Leonard H. Gerin
*Attorney*—McCarthy, Depaoli, O'Brien and Price

[57] ABSTRACT

A control system for controlling the line pressure in a hydraulic control system of an automotive automatic power transmission in which a line pressure regulator valve is controlled by a variable back pressure produced by a servo valve which is actuated by an electronic control circuit in accordance with changes in vehicle speed. The voltage to be supplied to the servo valve is increased in proportion to the turbine speed of a value and, when the turbine speed exceeds the predetermined value, the voltage to be applied to the servo valve remains constant. The line pressure is thus regulated in a manner to follow the output torque of the torque converter to thereby control the line pressure to an appropriate level for effecting smooth shifting between the gear ratios.

4 Claims, 11 Drawing Figures

INVENTORS
YOICHI MOHRI
BY HIROHISA ICHIMURA

ATTORNEYS

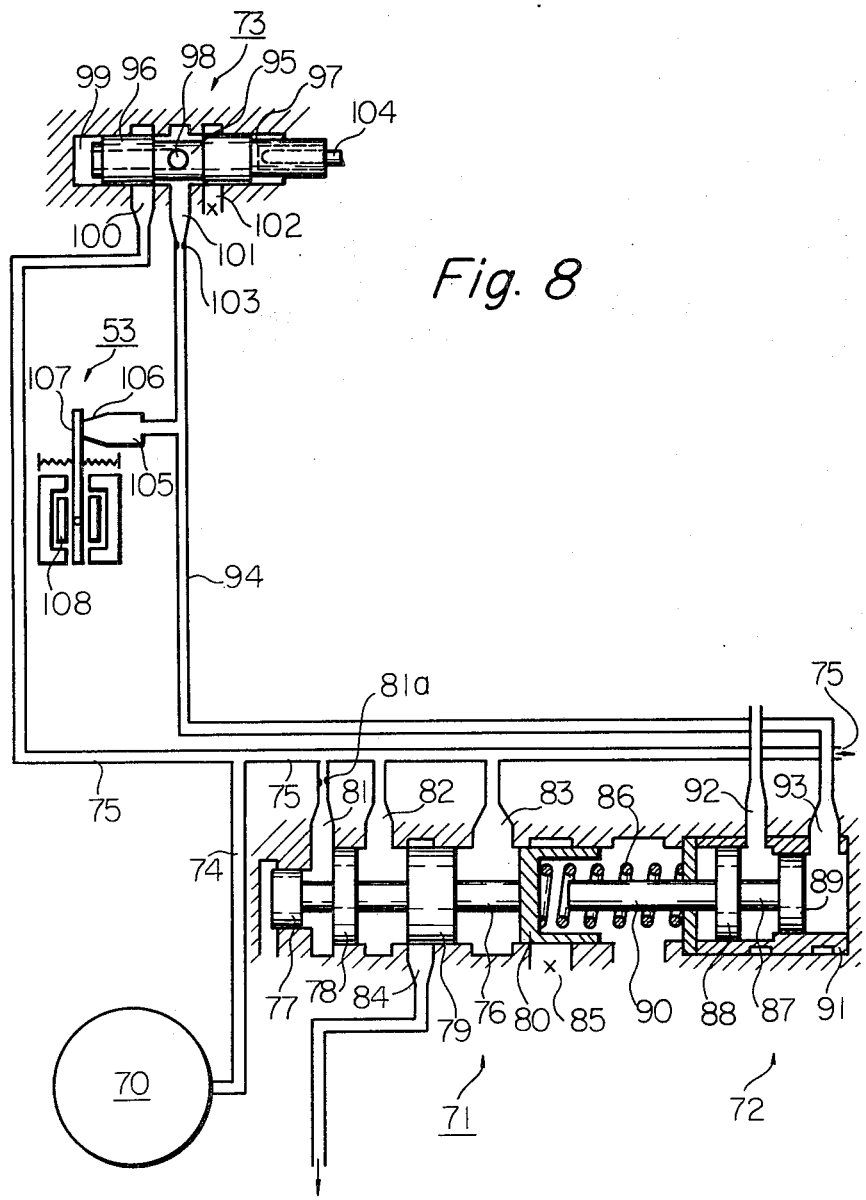

CONTROL SYSTEM FOR AN AUTOMOTIVE AUTOMATIC POWER TRANSMISSION

This invention relates to an automotive power transmission, and more particularly to a control system for the automotive automatic power transmission.

An automatic power transmission used in a motor vehicle commonly includes a hydraulic control system for controlling the friction elements such as friction clutches and brakes, to selectively provide a plurality of gear ratios. To effect smooth shifting between the gear ratios, it is desirable to change a torque capacity of the friction elements in accordance with the variations in engine load and vehicle speed. The required torque capacity increases as the engine load increases so that it must be relatively great at starting or during low speed driving and relatively small during high speed driving.

If the torque capacity of such friction element is difference small as compared to the required torque capacity at a given time, the slippage between the members to be coupled to each other will be too high, resulting in an inaccurate operation or runaway of the engine. If, in contrast, the torque capacity of the friction element is too large, the clutch or brake will engage instaneously and thus an objectionable shock will take place. Since the torque capacity of the friction element depends on the level of a line pressure in the hydraulic control system, smooth engagement of the friction elements can be accomplished by controlling the line pressure so as to minimize the different between the torque capacity of the friction element and the required torque to be transmitted.

In the conventional hydraulic control system, the line pressure is regulated by effecting a cutback by the use of a certain suitable means, such as a cutback valve. This cutback valve, however, is not fully acceptable because of its limited responsiveness and inability of effecting a smooth shifting between the gear ratios particularly where the power transmission is controlled electronically.

It is, therefore, an object of the invention to provide an improved control system for continuously or smoothly controlling a line pressure thereby to effect a smooth engagement of the friction elements.

In the drawings:

FIG. 8 is a schematic view illustrating an example of a hydraulic control circuit forming part of the control system of FIG. 2;

Figure 1:
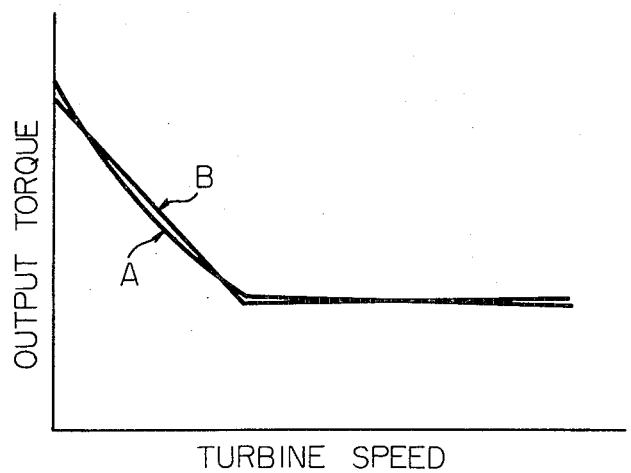
FIG. 1 is a graphical representation of the variation of the output torque against the turbine speed of a torque converter used in a common automatic power transmission.

As illustrated in FIG. 1, the output torque of the torque converter varies with the turbine speed thereof as shown by curve A. In order to achieve smooth engagement of the friction elements, it is preferred to control the line pressure substantially in proportion to the output torque of the torque converter. According to the present invention, the line pressure is modulated in such a manner as to follow a curve B which is essentially similar to the curve A.

Figure 2:
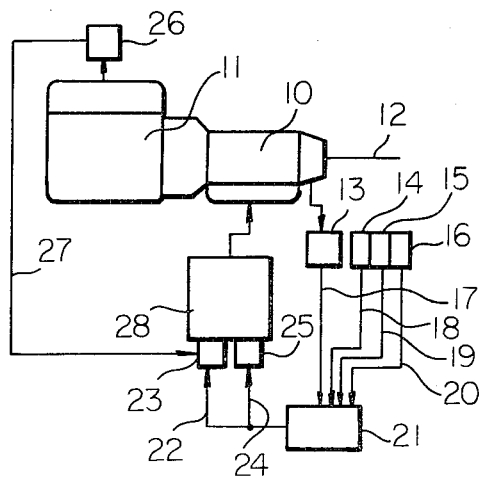
FIG. 2 is a schematic view of a control system embodying the invention.

A control system embodying the invention is schematically illustrated in FIG. 2, the system being shown as incorporated in a usual automatic power transmission which is generally indicated by reference numeral 10. The power transmission 10 has, as is cutomary, a drive shaft (not shown) which is connected to and driven by a suitable prime mover such as an internal combustion engine 11, and a driven shaft 12 which is connected by suitable means to driving wheels (not shown) of the motor vehicle.

As shown, the control system includes a vehicle speed sensor 13 for electronically detecting the vehicle speed or the revolution speed of the driven shaft 12 to generate a voltage signal corresponding to the detected revolution speed. The driving conditions of the motor vehicle are sensed not only by the vehicle speed sensor 13 but by various sensing means such as a vehicle inclination sensor 14, an engine temperature sensor 15 and a throttle valve opening sensor 16. The vehicle inclination sensor 14 detects an inclination of the vehicle when the vehicle runs on an ascent or descent for generating a voltage signal corresponding to the inclination detected. The engine temperature sensor 15 detects the temperature at which the engine operates and generates a voltage signal corresponding to the detected temperature. Each of the thus generated voltage signals is then supplied through lines 17, 18, 19 and 20, respectively, to a shift pattern selecting circuit 21.

The shift pattern selecting circuit 21 is adapted to produce a shift pattern for the preferred gear ratio in accordance with the varying driving conditions of the vehicle for generating a shifting signal. The shifting signal is supplied on one hand through a line 22 to a control system 23 and on the other hand through a line 24 to a shift valve control circuit 25.

A vacuum sensor 26 is provided for producing a pressure signal corresponding to the vacuum in the intake manifold of the engine 11. The pressure signal is then applied through a line 27 to the control system 23 and is utilized for varying the line pressure. This line pressure is supplied to a hydraulic circuit 28 from which it is passed to control or servo devices of the friction elements. The hydraulic circuit 28 is of a known construction so that the detailed description thereof is herein omitted. The shift valve control circuit 25 operates to control the shift valves in response to the shifting signal delivered from the shift pattern selecting circuit 21 for thereby effecting a shifting between the gear ratio of the transmission. The shift valve control circuit 25 does not constitute part of this invention and, as such, detailed description thereof is herein omitted.

Figure 3:
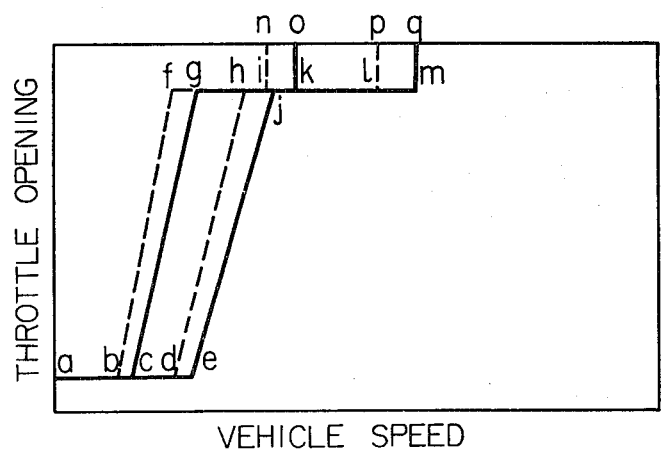
FIGS. 3 and 4 are examples of preferred shifting patterns attainable with the automatic power transmission.
Figure 4:
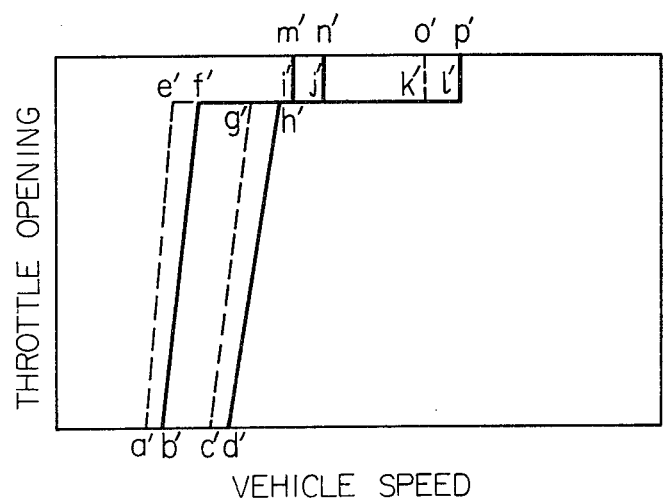

Preferred examples of the shift patterns which are available with use of the shift pattern selecting circuit 21 are illustrated in FIGS. 3 and 4. FIG. 3 represents the shift pattern attained when the vehicle is running on a level road and FIG. 4 indicates the shift pattern which is attained when the vehicle is running on an ascent or descent. In FIG. 3, the curve a–c–g–k–o indicates the shifting point at which a low speed drive ratio is shifted to intermediate and the curve a–e–j–m–q indicates the shifting point at which the intermediate speed drive ratio is shifted to high, while the curve a–d–h–l–p indicates the shifting point at which the high speed drive ratio is shifted to intermediate and the curve a–b–f–i–n indicates the shifting point at which the intermediate speed drive ratio is shifted to low. When the vehicle is running on the level road, the shift pattern selecting circuit 21 generates the shifting signals for the low, intermediate and high speed drive ratios in accordance with the shift patterns shown in FIG. 3. FIG. 4 illustrates how the shift pattern is varied so as to raise the shifting point to a higher vehicle speed when the vehicle is running on an ascent, when a brake is applied on the engine while the vehicle is running on a descent and when the engine is operating at a low temperature. For example, when the vehicle is running on a slope inclined at a certain angle, the shift pattern selecting circuit 21 generates the shifting signal which is in agreement with the shift pattern of FIG. 4. The shift pattern may be changed by the signals delivered from the engine temperature sensor 15 in the same manner as discussed hereinabove. Furthermore, the shift pattern may be so prescribed as to vary when a brake pedal (not shown) is depressed. In FIG. 4, the curve $b'-f'-j'-n'$ indicates the shifting point at which the low speed drive ratio is shifted to intermediate and the curve $d'-h'-l'-p'$ indicates the shifting point at which the intermediate speed drive ratio is shifted to high, while the curve $c'-g'-k'-o'$ indicates the shifting point at which the high speed drive ratio is shifted to intermediate and the curve $a'-e'-i'-m'$ indicates the shifting point at which the intermediate speed drive ratio is shifted to low, respectively. Thus, the shift pattern selecting circuit 21 produces the shifting signals for the low, intermediate and high speed drive ratios in accordance with the driving conditions of the vehicle, which signals are then supplied to the control system 23. The control system 23 largely comprises an electronic circuit and a hydraulic control circuit.

Figure 5:
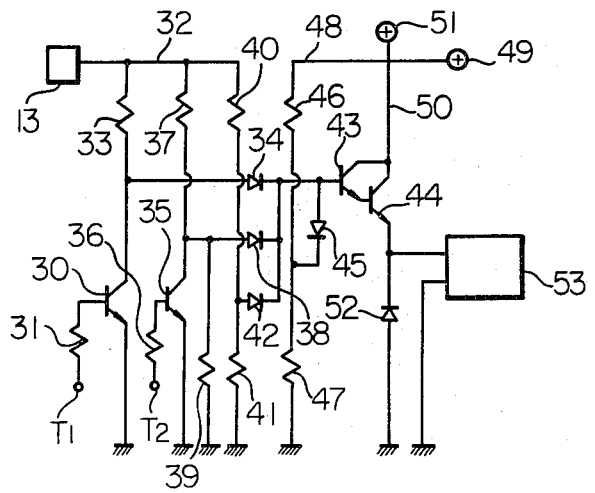
FIGS. 5 and 6 are diagrams illustrating electronic control circuits used in the control system of FIG. 2.

An example of the electronic control circuit is schematically shown in FIG. 5. As shown, a transistor 30 is connected at its base to a terminal $T_1$ through a resistor 31. The collector of the transistor 30 is connected to a line t through a resistor 33 and directly connected to a diode 34. The emitter of transistor 30 is grounded. A transistor 35 is provided which is connected at its base to a terminal $T_2$ through a resistor 36. The collector of the transistor 35 is connected to the line 32 through a resistor 37 and directly to a diode 38. The emitter of the transistor 35 is grounded. The collector of the transistor 35 is also grounded through a resistor 39. The line 32 is connected to the vehicle speed sensor 13 and receives the voltage signal delivered therefrom. On the other hand, the line 32 is grounded through resistors 40 and 41. A diode 42 is provided between the resistor 40 and 41. Each of the diodes 34, 38 and 42 is connected to the base of a transistor 43 which forms a Darlington connection with a transistor 44. The base of the transistor 43 is connected through a diode 45 to the junction of resistors 46 and 47. The diode 45 functions to prevent a flow of an excess voltage across the transistor 43. The resistor 46 is connected to a line 48 which in turn is connected to a stabilizing power supply source 49. The line 48 is grounded through the resistors 46 and 47 which are connected in series with each other. The junction of the collectors of the transistors 43 and 44 is connected to a line 50 which in turn is connected to a suitable power source 51 supplying a D.C. voltage. The emitter of the transistor 44 is grounded through a diode 52 which prevents a flow of an excess voltage across the transistor 44. The emitter of the transistor 44 is also connected to a coil (not shown) of a servo valve 53. The transistor 44 amplifies the D.C. voltage supplied to the line 50.

When, in operation, the first shifting signal is generated by the shift pattern selecting circuit 21, the voltage is applied to the terminal $T_2$ and not to the terminal $T_1$, whereby the transistor 30 is made non-conductive. At this instant, the voltage appearing at the line 32 passes through the diode 34 to the base of the transistor 43. When the second shifting signal is generated by the shift pattern selecting circuit 21, the voltage is applied to the terminal $T_1$ and not to the terminal $T_2$, whereby the transistor 35 is made non-conductive. At this instant, the voltage appearing at the line 32 is divided by the resistors 37 and 39. The thus divided voltage is then applied through the diode 38 to the base of the transistor 43. When the third shifting signal is generated, no voltage is applied to either of the terminals $T_1$ and $T_2$ so that the voltage appearing at the line 32 is divided by the resistors 40 and 41. The voltage thus divided is applied through the diode 42 to the base of the transistor 43.

Now, assuming that the gear ratios for the low and intermediate speeds are $G_1$ and $G_2$, respectively, the ratio of the resistance 47 vs. the resistance 39 is $(G_1-G_2):G_2$, and the ratio of the resistance 40 vs. the resistance 41 is $(G_1-1):1$, the voltage applied to the base of the transistor 43 varies in proportion to the turbine speed of the torque converter independently of the shifting points of the transmission. The voltage supplied to the base of the transistor 43 is held constant by the action of the diode 45.

It will be understood that the voltage supplied to the coil of the servo valve 53 varies substantially in proportion to the turbine speed of the torque converter until the turbine speed reaches a predetermined value; the voltage remains constant once such predetermined value is reached.

Figure 6:
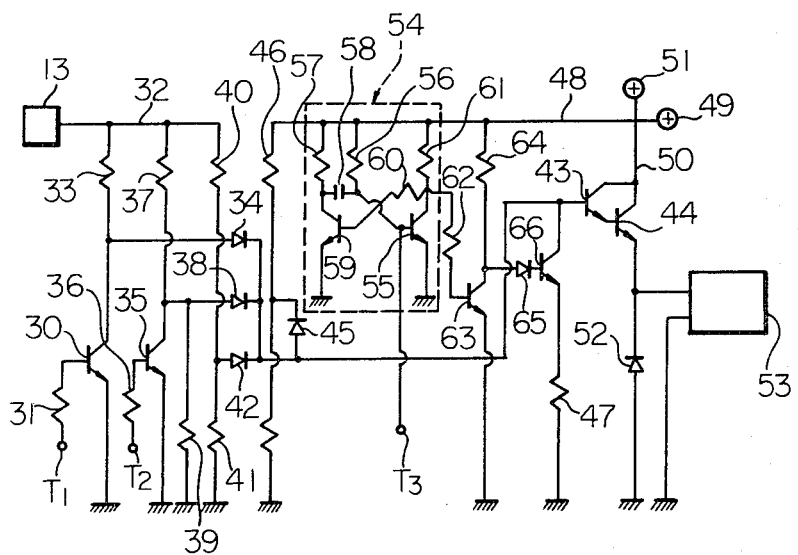

A modified form of the electronic control circuit is shown in FIG. 6 wherein a monostable multivibrator 54 is provided. The monostable multivibrator 54 interrupts the supply of the voltage to the coil of the servo valve 53 for a certain period of time so as to synchronize the elements to be engaged during shifting of the gear ratios. The monostable multivibrator 54 per se is of an ordinary construction, so that the detailed description is herein omitted. In general, the monostable multivibrator 54 has a terminal $T_3$ to which a negative voltage is to be applied. The terminal $T_3$ is connected to the base of a transistor 55, and the emitter thereof is grounded. The base of the transistor 55 is connected to the line 48 through a resistor 56. The resistor 56 in turn is connected in parallel with a resistor 57. Between the resistors 56 and 57 is interposed a capacitor 58 which is connected to the collector of a transistor 59. The emitter of the transistor 59 is grounded, and the base thereof is connected through a resistor 60 to the collector of the transistor 55. The junction of resistor 60 and the collector of the transistor 55 is connected on one hand through a resistor 61 to the line 48 and on the other hand through a resistor 62 to the base of a transistor 63. The collector of the transistor 63 is connected through a resistor 64 to the line 48, and the emitter thereof is grounded. The collector of the transistor 63 is connected to a diode 65 which in turn is connected to the base of a transistor 66. The collector of the transistor 66 is connected to the base of the transistor 43, and the emitter thereof is grounded through a resistor 67.

When the negative voltage is applied to the terminal $T_3$, the transistor 55 becomes conductive, thereby rendering the transistor 63 non-conductive. Consequently, the voltage across the line 48 is applied through the diode 65 to the base of the transistor 66, whereby the transistor 66 is made conductive. At this instant, the voltage is not applied to the base of the transistor 63. After a certain period of time has elapsed, the transistor 63 becomes conductive, thereby de-energizing the transistor 66. With the transistor 66 made non-conductive, the modified electronic control circuit operates in a manner previously discussed in connection with the arrangement shown in FIG. 5.

Figure 7:
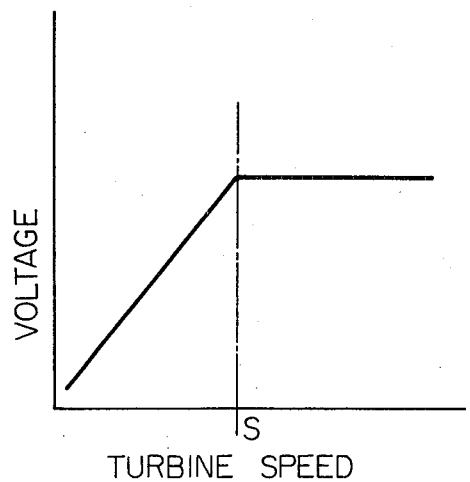
FIG. 7 is a graphical representation of the variation of an electric current to be supplied to a coil of a servo valve electrically connected to the electronic control circuits of FIGS. 5 and 6.

FIG. 7 illustrates an example of the variation in the voltage as obtained by the use of the electronic control circuit of either FIG. 5 or 6. As shown, the voltage varies in proportion to the turbine speed of the torque converter until the turbine speed reaches a point S and when the turbine speed exceeds the point S, then the voltage remains unchanged.

Referring now to FIG. 8, there is schematically shown the hydraulic control circuit which is controlled by the electronic control circuit shown in FIG. 5 or 6 so as to modulate the line pressure for effecting a smooth shifting between the gear ratios. While the various control devices such as manual selector valve and other shift valves are not shown in FIG. 8 for simplicity of illustration, it should be kept in mind that the hydraulic control circuit forming part of the control system of this invention is used in combination with such control devices.

As shown, the hydraulic control circuit includes an oil pump 70, a line pressure regulator valve 71, an amplifier valve 72, a throttle valve 73 and the servo valve 53 discussed above.

The oil pump 70, which may be of any suitable construction, supplies a pressurized fluid from a sump (not shown) to a fluid pressure supply conduit 74 from which it is passed to a line pressure conduit 75. The line pressure conduit 75 is connected to the line pressure regulator valve 71 which in turn is connected to control or servo devices, not shown, for actuating the friction elements to effect shifting between the gear ratios in the power transmission.

The line pressure regulator valve 71 includes a slidable valve spool 76 having a plurality of spaced lands 77, 78, 79 and 80 and regulates the fluid pressure in the line pressure conduit 75. The regulator valve 71 has ports 81, 82, 83, 84 and 85. The port 81, which has an orifice 81a therein, communicates with the line pressure conduit 75, with which the ports 82 and 83 also communicate. The port 85 is a drain port through which the excess fluid in the line pressure conduit 75 is drained off to reduce the line pressure. A spring 86 is provided for biasing the valve spool 76 leftwardly of the drawing. In the shown condition, the valve spool 76 is held in a position where the force produced by the fluid pressure and acting on the differential area between the lands 77 and 78 balances with the force of the spring 86. The regulator valve 71 cooperates with the amplifier valve 72 to modulate the line pressure.

The amplifier valve 72 includes a slidable valve spool 87 having spaced lands 88 and 89. On the valve spool 87 is mounted a push rod 90 which cooperate with the land 80 of the regulator valve 71 to increase the line pressure in the line pressure conduit 75. The valve spool 87 is slidably disposed in a sleeve 91 which has ports 92 and 93. The port 93 communicates with a conduit 94 which in turn communicates with the throttle valve 73.

The throttle valve 73 includes a slidable valve spool 95 having spaced lands 96 and 97. The valve spool 95 has formed therein a bore 98 which communicates with a valve chamber 99. The throttle valve 73 has a plurality of ports 100, 101 and 102. The port 100 communicates with the line pressure conduit 75. The port 101 communicates with the conduit 94 which has an orifice 103. On the land 97 is mounted a push rod 104 of the vacuum sensor 26 discussed above. The vacuum sensor 26, which may be of any suitable construction, communicates with the intake manifold of the engine (not shown). The vacuum sensor 26 moves the push rod 104 into contact with the valve land 97 depending upon the variation in the intake manifold vacuum of the engine. Thus, the push rod 104 biases the valve spool 95 leftwardly of the drawing in response to the intake manifold vacuum of the engine.

On the other hand, the fluid pressure in the port 100 is drawn into the valve chamber 99 through the bore 98 and thus acts on the end of the valve land 96. By this action, the fluid pressure is modulated to a value that is determined by the force acting on the valve land 97. Consequently, the fluid pressure in the conduit 101 rises when the throttle valve is fully open and falls when the throttle valve is slightly open, that is, when the intake manifold vacuum is relatively high. Thus, the fluid pressure in the port 101 responds to the intake manifold vacuum of the engine and is utilized for varying the line pressure. This fluid pressure is herein referred to as a throttle pressure. The throttle pressure in the port 101 is delivered through the orifice 103 to the servo valve 53.

The servo valve 53 largely comprises a fluid chamber 105, a fluid jet nozzle 106, a flapper 107 and a coil 108. The fluid chamber 105 communicates with the conduit 94. The flapper 107 is positioned to be opposite to the opening of the nozzle 106. The coil 108 of the servo valve 53 is energized by the electronic control circuit discussed hereinbefore. The sectional area of the nozzle 106 is greater than that of the orifice 103, so that the fluid pressure in the fluid chamber 105 is higher than the throttle pressure in the conduit 75 when the flapper 107 is held in a position to close the nozzle 106.

When, in operation, the coil 108 of the servo valve 53 is energized, the flapper 107 is retracted so that the nozzle 106 is opened. This occurs when the vehicle is running at a relatively high speed. In this instance, the fluid obtaining in the fluid chamber 105 is discharged through the nozzle 106, whereby the throttle pressure is decreased. The throttle pressure thus decreased is then passed to the port 93 of the amplifier valve 72 through the conduit 94 and thus acts on the valve land 89, thereby moving the push rod 90 leftwardly of the drawing. This causes the push rod 90 to engage with the valve land 80 of the regulator valve 71. The valve spool 76 is moved to a position in which the force acting on the valve land 80 balances with the force acting on the differential area between the lands 77 and 78, with the result that the communications between the ports 82 and 84 and between the ports 83 and 85 are established. The line pressure in the line pressure conduit 75 is now discharged from the port 82 into the port 84 and also discharged from the port 83 into the port 85 and hence the line pressure applied to the friction elements is decreased. The friction element (not shown) are then actuated softly at higher vehicle speeds and an objectionable mechanical shock is prevented.

As the vehicle speed increases, the voltage supplied to the coil 108 becomes higher, so that the flapper 107 opens the nozzle 106 wider. Consequently, the throttle pressure in the port 94 is further decreased, whereby the communications between the ports 82 and 84 and between the ports 83 and 85 become greater. As a result, the line pressure applied to the friction elements is further decreased. Thus, smooth engagement of the friction elements is accomplished.

When, now, the coil 108 of the servo valve 53 is energized, the flapper 107 protrudes and thus completely closes the nozzle 106. With the nozzle 106 closed, a back pressure is built up in the fluid chamber 105. The back pressure is passed through the conduit 94 to the port 93 and thus acts on the land 89 of the amplifier valve 72. This causes the valve spool 76 to move leftwardly of the drawing, with the result that the communications between the ports 82 and 84 and between the ports 83 and 85 are interrupted. Thus, the line pressure to be applied to the friction elements is increased when the vehicle is driven at a relatively low speed. The friction elements then engage at an increased torque so that a slippage between the elements can be prevented.

Figure 9:
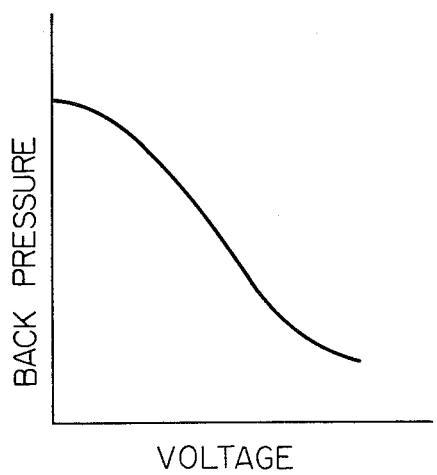
FIG. 9 is a graphical representation of the relationship between a back pressure built up in a fluid chamber of the servo valve used in the hydraulic control circuit of FIG. 8 and the electric current to be supplied to the coil of the servo valve.

FIG. 9 represents the variation of the back pressure which is plotted against the voltage. As shown, the back pressure decreases as the voltage increases. This is because of the fact that the flapper 107 opens the nozzle 106 more widely as the electric current to be supplied to the coil 108 increases.

Figure 10:
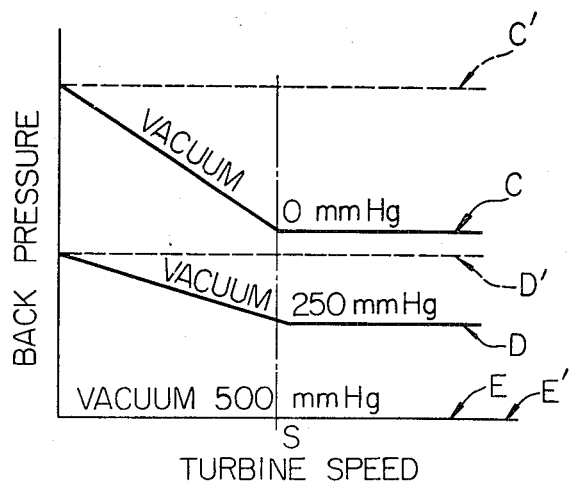
FIG. 10 is a graphical representation of the relationship between the back pressure of FIG. 9 and the turbine speed of a torque converter.

FIG. 10 illustrates the variation in the back pressure which is obtained as a result of the action of the servo valve 53. In FIG. 10, curves C, D and E indicate the back pressures produced when the intake manifold vacuums are 0 mm Hg, 250 mm Hg, and 500 mm Hg, respectively.

The curves C', D' and E' indicate the throttle pressures delivered to the fluid chamber 105 under the same conditions as in the case with the curves a, b and c. As shown, the back pressure decrease along the curves C and D, respectively, until the turbine speed reaches a point S but remain constant beyond the point S. This is because of the fact that the voltage to be supplied to the coil 108 varies as shown in FIG. 1.

Figure 11:
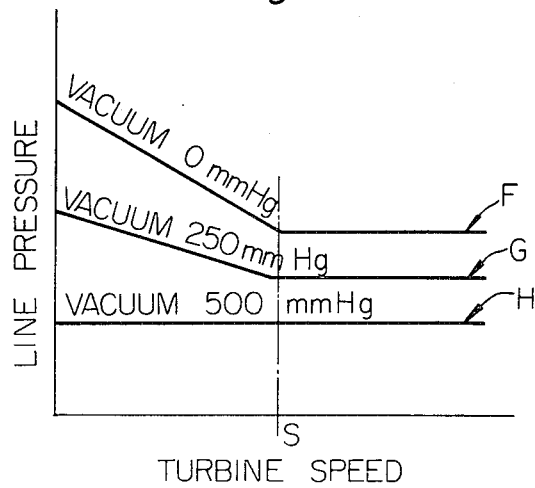
FIG. 11 is a graphical representation of the line pressures which are obtainable in accordance with the invention.

FIG. 11 illustrates the variation in the line pressure which is obtained as a result of the action of the servo valve. As shown in FIG. 11, the line pressures vary along the curves F, G and H, respectively, until the turbine speed reaches a point S but remain unchanged beyond the point S. The reason accounting for this has previously been discussed.

It will be noted from the foregoing that, in accordance with the invention, since the line pressure can be controlled in relation to the revolution speed of the turbine shaft of a torque converter whereby the line pressure is varied in accordance with the curve B of FIG. 1 substantially in proportion to the output torque of the torque converter, an appropriate line pressure is always supplied to the motors of the friction elements.

What is claimed is:

1. A control system for controlling a line pressure in a hydraulic control system of an automatic power transmission of a motor vehicle having an engine said automatic power transmission having friction elements to selectively provide a plurality of gear ratios, comprising in combination, sensing means operatively connected to the driven shaft of said transmission to sense vehicle speed for generating a first voltage signal corresponding thereto, an electronic control circuit electrically connected to said sensing means and responsive to said first voltage signal for generating a second voltage signal, a servo valve controlled in response to said second voltage signal and communicating with said hydraulic control system, said servo valve including a fluid chamber, a fluid jet nozzle and a flapper for producing a back pressure in said fluid chamber, an amplifier valve communicating with said servo valve and responsive to said back pressure, and a line pressure regulator valve provided in said hydraulic control system for regulating the line pressure, said back pressure being applied to said amplifier valve whereby the amplifier valve controls said regulator valve for regulating the line pressure in said hydraulic control system.

2. A control system according to claim 1, wherein said electronic control circuit includes a plurality of transistors, resistors and diodes for varying said second voltage signal substantially in proportion to a turbine speed of a torque converter of said transmission until the turbine speed reaches a predetermined value and to cause said second voltage signal to remain unchanged when the turbine speed exceeds said predetermined value.

3. A control system according to claim 2, wherein said electronic control circuit further includes a monostable multivibrator adapted to prevent said second voltage signal from being applied to said servo valve for timed sequence for thereby synchronizing said friction elements to be engaged during shifting between the gear ratios.

4. A control system according to claim 1, wherein said line pressure regulator valve is connected to a throttle valve producing a throttle pressure in relation to the output torque of the engine, said throttle pressure being applied to said servo valve to build up said back pressure.

* * * * *